United States Patent [19]

Dumbaugh, Jr.

[11] Patent Number: 5,116,787

[45] Date of Patent: May 26, 1992

[54] HIGH ALUMINA, ALKALINE EARTH BOROSILICATE GLASSES FOR FLAT PANEL DISPLAYS

[75] Inventor: William H. Dumbaugh, Jr., Painted Post, N.Y.

[73] Assignee: Corning Incorporated, Corning, N.Y.

[21] Appl. No.: 743,799

[22] Filed: Aug. 12, 1991

[51] Int. Cl.$^5$ .................... C03C 3/085; C03C 3/091
[52] U.S. Cl. .................... 501/66; 340/719; 359/82; 501/69
[58] Field of Search ............ 501/66, 69; 340/719; 359/82

[56] References Cited

U.S. PATENT DOCUMENTS

| | | | |
|---|---|---|---|
| 4,634,683 | 1/1987 | Dumbaugh, Jr. | 501/69 |
| 4,634,684 | 1/1987 | Dumbaugh, Jr. | 501/69 |
| 4,824,808 | 4/1989 | Dumbaugh, Jr. | 501/66 |
| 4,994,415 | 2/1991 | Imai et al. | 501/66 |

*Primary Examiner*—Mark L. Bell
*Attorney, Agent, or Firm*—C. S. Janes, Jr.

[57] ABSTRACT

This invention relates to glasses for use as substrates in flat panel display devices which use polycrystalline silicon thin film transistors. The compositions for those glasses are essentially free from alkali metal oxides and MgO and consist essentially, in weight percent, of:

| | | | |
|---|---|---|---|
| $SiO_2$ | 63–68 | BaO | 4.5–10 |
| $Al_2O_3$ | 7.5–11 | CaO + SrO + BaO | 14–26 |
| CaO | 9.5–16 | $B_2O_3$ | 1–7 |
| SrO | 0–5 | | |

2 Claims, No Drawings

HIGH ALUMINA, ALKALINE EARTH BOROSILICATE GLASSES FOR FLAT PANEL DISPLAYS

RELATED APPLICATIONS

U.S. application Ser. No. 07/743,800, filed concurrently herewith by me under the title ALKALINE EARTH ALUMINO BOROSILICATE GLASSES FOR FLAT PANEL DISPLAYS, is directed to glasses designed for use as substrates in flat panel display devices utilizing polycrystalline silicon thin film transistors. The glasses disclosed therein exhibit strain points higher than 675° C., liquidus temperatures below 1125° C., long term stability against devitrification, and having compositions essentially free from alkali metal oxides while consisting essentially, in mole percent, of:

| | | | |
|---|---|---|---|
| $SiO_2$ | 60-65 | BaO | 0-9 |
| $Al_2O_3$ | 8-10 | MgO + CaO + SrO + BaO | 23-28 |
| CaO | 1-24 | $B_2O_3$ | 1-4 |
| SrO | 0-12 | MgO | 0-4 |

U.S. application Ser. No. 07/743,802, filed concurrently herewith in the names of W. H. Dumbaugh, Jr. and J. C. Lapp under the title STRONTIUM ALUMINOSILICATE GLASSES FOR FLAT PANEL DISPLAYS, is likewise directed to glasses designed for use as substrates in flat panel display devices utilizing polycrystalline silicon thin film transistors. The glasses disclosed therein exhibit strain points higher than 675° C., liquidus temperatures no higher than 1325° C., long term stability against devitrification, liquidus viscosities greater than $1.5 \times 10^5$ poises, and having compositions essentially free from alkali metal oxides and MgO, while consisting essentially, in mole percent, of:

| | | | |
|---|---|---|---|
| $SiO_2$ | 65-75 | CaO and/or BaO | 0-10 |
| $Al_2O_3$ | 6-10 | $B_2O_3$ | 0-5 |
| SrO | 15-26 | [CaO and/or BaO] + $B_2O_3$ | 0-12 |

BACKGROUND OF THE INVENTION

Glass has been chosen as a substrate in liquid crystal display devices for several reasons (1) it is transparent; (2) it can withstand the chemical and physical conditions to which it is exposed during display processing; and (3) it can be manufactured at reasonable cost in thin sheets with precisely controlled dimensions. Liquid crystal displays are passive displays which are dependent upon external sources of light for illumination. They are fabricated as segmented displays or in one of two basic matrix configurations. The substrate needs of the two matrix types differ. The first type is intrinsic matrix addressed, relying on the threshold properties of the liquid crystal material. The second type is extrinsic matrix or active matrix addressed, in which an array of diodes, metal-insulator-metal devices, or thin film transistors (TFTs) supplies an electronic switch to each pixel. In both designs, however, two sheets of glass form the structure of the display.

Intrinsically addressed liquid crystal displays are fabricated employing thin film deposition at temperatures ≦350° C., followed by photolithographic patterning. Because of the low temperature requirements involved in the process, soda lime silicate glass having a silica barrier layer thereon to prevent migration of Na+ ions has been used extensively as substrates therefor. A higher performance version of intrinsically addressed liquid crystal displays, termed the super twisted nematic, has an added substrate requirement of extremely precise flatness. That requirement has demanded the soda lime silicate glasses employed in those displays be polished. Alternatively, Corning Code 7059 glass, a barium boroaluminosilicate glass marketed by Corning Incorporated, Corning, N.Y., which is precision formed into sheet requiring no surface polishing utilizing the downdraw fusion pipe, such as is described in U.S. Pat. Nos. 3,338,696 (Dockerty) and 3,682,609 (Dockerty), has been employed.

Extrinsically addressed liquid crystal displays can be subdivided into two categories: the first based upon metal-insulator-metal or amorphous silicon (a-Si) devices; and the second based upon polycrystalline silicon (poly-Si) devices. Devices formed from poly-Si are processed at substantially higher temperatures than those employed with a-Si thin film transistors. Those temperatures have demanded the use of glasses exhibiting higher strain points than soda lime silicate glasses and Corning Code 7059 glass to prevent thermal deformation of the sheet during processing. The lower the strain point of the glass, the greater this dimensional change. A practical solution to that problem is to develop glasses demonstrating high strain points so that the dimensional change is minimized during device processing at temperatures of about 600° C..

Contamination of thin film transistors by sodium migrating from the glass substrate is a major concern during processing. That problem has led to the use of a coating on the substrate glass to provide a barrier to the migration of the alkali.

Therefore, the principal objective of the present invention was to devise glass compositions operable as substrates in liquid crystal displays utilizing poly-Si thin film transistors, the glass compositions being essentially free from alkali metal oxides, being relatively inert to the chemicals used in display processing, having a strain point higher than 625° C., and, most vitally, exhibiting long term stability against devitrification when in contact with platinum metal and high temperature refractory ceramic materials utilized in the downdraw fusion pipe referred to above for precision forming thin glass sheeting.

SUMMARY OF THE INVENTION

As has been indicated above, a most critical requirement which the inventive glass must satisfy is its resistance to the development of devitrification when exposed for very long periods to platinum metal and ceramic materials of high refractoriness at temperatures where the glass exhibits a viscosity of about $10^4$–$10^6$ poises. The drawing of glass sheet utilizing a fusion pipe does not impart the very fast quenching action of conventional pressing processes for shaping glass articles. By the very nature of the process, molten glass may remain in contact with the refractory components of the melting unit for as long as 30 days.

It is very difficult to evaluate in the laboratory the tendency of a glass to devitrify under the conditions present in sheet drawing glass. As a first approximation, a "liquidus" measurement is used. In reality, however, because of the method used in the laboratory, that measurement is not a true liquidus. Thus, the measuring technique involves placing crushed glass in a platinum boat which is then introduced into a gradient furnace having a temperature spread spanning the range wherein the liquidus is thought to be located. After 24 hours the boat is removed from the furnace, allowed to cool, the glass removed therefrom, thin sections prepared from the glass, and those thin sections examined microscopically. A measurement is made of the maximum temperature at which crystals are observed. The viscosity corresponding to this "liquidus" temperature provides the first estimate as to whether a particular glass is close to acceptability.

The critical viscosity for forming glass sheet utilizing the downdraw fusion pipe process is about $1-3 \times 10^5$ poises. Accordingly, to better evaluate the devitrification proclivity of a glass for use in that process, a solid piece of the glass is heated to a temperature well above the liquidus while in contact with platinum or a highly refractory ceramic material, such as alumina or zircon, depending upon which fusion pipe material is most suitable for a given glass composition. Thereafter, the molten glass is cooled to a viscosity within the glass forming range and that temperature is held for seven days. The sample is thereafter examined visually for the presence of crystals. Because the inventive glasses are designed to be used in forming sheet via the downdraw fusion pipe process, the compositions will exhibit a viscosity at the liquidus temperature greater than about $1.5 \times 10^5$ poises.

Corning Code 7059, consisting essentially, expressed in terms of weight percent on the oxide basis, of about 25% BaO, 10% $Al_2O_3$, 15% $B_2O$, and 50% $SiO_2$, exhibits a strain point of 593° C. and a linear coefficient of thermal expansion (25°-300° C.) of $46 \times 10^{-7}$/° C.. Because of its freedom from alkali metal oxide and its utility in forming thin glass sheet via the downdraw fusion pipe, Corning Code 7059 glass has been used extensively as a substrate in a-Si devices. In an effort to devise glasses for use as substrates in poly-Si devices, a research program was initiated to develop glasses demonstrating higher strain points and other properties superior to those of Code 7059 glass, such as to render them applicable as substrates for liquid crystal displays utilizing polycrystalline silicon thin film transistors.

That research program resulted in glasses essentially free from alkali metal oxides consisting essentially, expressed in terms of mole percent on the oxide basis, of:

| $SiO_2$ | 63-68 | BaO | 4.5-10 |
|---|---|---|---|
| $Al_2O_3$ | 7.5-11 | CaO + SrO + BaO | 14-26 |
| CaO | 9.5-16 | $B_2O_3$ | 1-7 |
| SrO | 0-5 | | |

An extremely critical discovery emanating from that research was the need for excluding MgO from the glass composition. Thus, it was observed that magnesium silicate precipitated out of the glass at a higher temperature than the other crystalline phases, thereby, in effect, leading to enhanced crystal growth. Accordingly, the inventive glass compositions will be essentially free from MgO; that is, in like manner to alkali metal oxides, no substantive amount of a magnesium-containing material will be included in the batch ingredients.

The concentrations of the several components are vital to securing the optimum liquidus viscosity and highest resistance to long term devitrification. To illustrate:

In order to achieve a sufficiently high strain point in the glass, the $SiO_2$ level must be maintained at a minimum content of 63%, but when the $SiO_2$ content exceeds 68% the glasses become too viscous for melting and forming using standard glassmaking equipment. When the concentration of $Al_2O_3$ is outside the 7.5-11% interval, the liquidus temperature rises significantly. Maintenance of the $B_2O_3$ level between 1-7% is useful in lowering the melting viscosity, but amounts over 7% hazard decreasing the value of the strain point. The total content of alkaline earth metal oxides must be at least 14% to assure good glass meltability, but concentrations above 26% tend to decrease the temperature of the strain point. BaO is a necessary part of the total alkaline earth metal oxide content because it lowers the liquidus temperature while not seriously reducing the viscosity of the glass. The levels of $Al_2O_3$ and BaO are especially important in maintaining the liquidus temperature below 1075° C.

The preferred glass compositions consist essentially, in mole percent, of 64-66% $SiO_2$, 8-10% $Al_2O$, 10-15% CaO, 0-3% SrO, 4.5-8% BaO, 18-24% CaO+SrO+-BaO, and 2-6% $B_2O_3$.

Whereas it is not possible mathematically to precisely convert mole percent to weight percent, the following ranges represent approximations of the inventive glass compositions in terms of weight percent.

| $SiO_2$ | 53-60 | BaO | 11-18 |
|---|---|---|---|
| $Al_2O_3$ | 11-16 | CaO + SrO + BaO | 20-30 |
| CaO | 8-15 | $B_2O_3$ | 2-6 |
| SrO | 0-10 | | |

PRIOR ART

U.S. Pat. No. 2,010,836 (Adams et al.) discloses glasses consisting essentially, in weight percent, of:

| $SiO_2$ | 25-45 | $Al_2O_3$ | 15-25 |
|---|---|---|---|
| $R_2O$ | 0-2.5 | ZnO | $\geq 5$ |
| CaO | 12-27 | $B_2O_3$ | 5-12 |

BaO is present in some of the working examples in amounts up to 5.2%. The levels of $SiO_2$ and BaO are below those required in the instant inventive compositions.

U.S. Pat. No. 2,135,662 (Hanlein et al.) describes a glass, consisting essentially, in weight percent, of:

| $SiO_2$ | 35 | CaO | 15 |
|---|---|---|---|
| $Al_2O_3$ | 30 | BaO | 10 |
| $B_2O_3$ | 10 | | |

The $SiO_2$ concentration is below that cited in the inventive glasses and the $Al_2O_3$ content is above.

U.S. Pat. No. 3,310,413 (Harrington) is concerned with glasses consisting essentially, in weight percent, of:

| $SiO_2$ | 53.5-59.5 | MgO | 0-5.0 |
|---|---|---|---|
| $Al_2O_3$ | 13.0-16.5 | BaO | 5.5-16.5 |
| $B_2O_3$ | 4.0-9.0 | CaO | 8.5-15.0 |

MgO is preferably present at 1–4% and the glasses exhibit liquidus temperatures below 1125° C. Whereas there is partial overlap between the patented compositions and those of the subject inventive glasses, the inclusion of MgO is preferred (and it is present in all but one of the working examples), the maximum liquidus temperature of the instant inventive glasses is 50° C. below that of the patented glasses, and none of the working examples in the patent come within the composition intervals of the present invention.

U.S. Pat. No. 3,496,401 (Dumbaugh, Jr.) reports glasses consisting essentially, in weight percent, of:

| $SiO_2$ | 55–70 | MgO + CaO + SrO + BaO | 10–25 |
|---|---|---|---|
| $Al_2O_3$ | 13–25 | $B_2O_3$ | 0–10 |

BaO is present in three of the seven working examples, the greatest amount being 7.55%. MgO is likewise included in three working examples, the greatest amount being 8.54%. Even excluding the occurrence of MgO, none of the working examples had a composition coming within the ranges of the present invention.

U.S. Pat. No. 3,978,362 (Dumbaugh, Jr. et al.) recites glass compositions consisting essentially, in weight percent, of:

| $SiO_2$ | 58–63 | MgO | 0–5 |
|---|---|---|---|
| $Al_2O_3$ | 13–16 | BaO | 0–7 |
| CaO | 14–21 | CaO + MgO + BaO | $\geq 19$ |

The BaO content is low and $B_2O_3$ is stated to be preferably absent.

U.S. Pat. No. 4,060,423 (Thomas) records glasses consisting essentially, in weight percent, of:

| $SiO_2$ | 55–68 | CaO | 7–13 |
|---|---|---|---|
| $Al_2O_3$ | 15–18 | BaO | 6–16 |

$B_2O_3$ is stated to be absent.

U.S. Pat. No. 4,255,198 (Danielson et al.) discusses glasses consisting essentially, in weight percent, of:

| $SiO_2$ | 61–65 | SrO | 6–9 |
|---|---|---|---|
| $Al_2O_3$ | 14–17 | MgO | 0–5 |
| CaO | 8–15 | BaO | 0–5 |

$B_2O_3$ is not referred to as a component of the patented glasses.

U.S. Pat. No. 4,302,250 (Danielson) relates to glasses consisting essentially, in weight percent, of:

| $SiO_2$ | 64–68 | SrO | 0–4 |
|---|---|---|---|
| $Al_2O_3$ | 16.5–18.5 | BaO | 0–5 |
| CaO | 11–14 | SrO + BaO | 2–6.5 |

$B_2O_3$ is not mentioned as a component of the patented glasses.

U.S. Pat. No. 4,394,453 (Dumbaugh, Jr.) sets out glasses consisting essentially, in weight percent, of:

| $SiO_2$ | 60.0 ± 1.5 | CaO | 11.4 ± 0.8 |
|---|---|---|---|
| $Al_2O_3$ | 17.0 ± 1.0 | MgO | 7.5 ± 0.8 |
| $B_2O_3$ | 5.0 ± 0.8 | | |

MgO is a required component in the patented glasses.

U.S. Pat. No. 4,409,337 (Dumbaugh, Jr.) is drawn to glasses consisting essentially, in weight percent, of:

| $SiO_2$ | 56–59 | CaO | 7.5–9.25 |
|---|---|---|---|
| $Al_2O_3$ | 16–17 | MgO | 5.5–6.25 |
| $B_2O_3$ | 4.5–5.25 | BaO | 5–9 |

MgO is a required component of the patented glasses.

U.S. Pat. No. 4,441,051 (Thomas) is directed to glasses designed for transparent envelopes for regenerative cycle halogen lamps, the glasses consisting essentially, in weight percent, of:

| $SiO_2$ | 52–60 | CaO | 8–12 |
|---|---|---|---|
| $Al_2O_3$ | 11–17 | $B_2O_3$ | 3–7 |
| BaO | 11–16 | Alkali Metal Oxides | 0–3 |

No reference is made in the patent to substrates for liquid crystal displays and the suggested inclusion of up to 3% alkali metal oxides is directly opposed to the requirement of the present inventive glasses that they be free from alkali metal oxides.

U.S. Pat. No. 4,994,415 (Imai) claims glasses suitable for use as substrates in liquid crystal display devices consisting essentially, in weight percent, of:

| $SiO_2$ | 55–58 | BaO | 11–20 |
|---|---|---|---|
| $Al_2O_3$ | 8–13 | SrO | 0–5 |
| $B_2O_3$ | 4–10 | ZnO | 0.5–7 |
| CaO | 4–7 | | |

The claimed level of CaO is below that required in the subject inventive glasses and ZnO is a necessary component in the patented glasses. ZnO flattens the viscosity-temperature curve, thereby undesirably lowering the strain point of a glass while increasing melting viscosity.

DESCRIPTION OF PREFERRED EMBODIMENTS

Table I below reports a number of glass compositions, expressed in terms of parts by weight on the oxide basis, illustrating the compositional parameters of the present invention. Inasmuch as the sum of the individual constituents totals or very closely approximates 100, for all practical purposes the recorded values can be regarded as representing weight percent. The batch ingredients may comprise any materials, either oxides or other compounds, which, when melted together with the other batch materials, will be converted into the desired oxide in the proper proportion. For example $CaCO_3$ can provide the source of CaO and $H_3BO_3$ the source of $B_2O_3$.

The batch ingredients were compounded, ballmilled together to assist in producing a homogeneous melt, and charged into platinum crucibles. After placing lids thereon, the crucibles were moved into a furnace operating at about 1600° C. and the batches melted for about 16 hours. Thereafter, the crucibles were withdrawn from the furnace, the melts poured onto a steel plate to form a glass slab having dimensions of about 30 cm × 15 cm × 1 cm, and the slabs transferred immediately to an annealer operating at about 715° C.. (Examples labelled 7059, 1733, and 1724 refer to glasses commercially marketed by Corning Incorporated.)

Although the above description reflects a laboratory melting procedure, it must be appreciated that the inventive glasses are capable of being melted and formed utilizing large scale, commercial glass melting and forming equipment. It will be recalled that the subject glasses were designed to be drawn into thin glass sheet utilizing the downdraw fusion pipe. Also, whereas not employed in the laboratory melts, conventional fining agents, e.g., $As_2O_3$ and $Sb_2O_3$, can be incorporated in the batches in proper amounts where deemed desirable.

Table I also reports measurements of several physical and chemical properties determined on the recorded glasses in accordance with techniques conventional in the glass art. Thus, the annealing point (A.P.), strain point (St.P.), and internal liquidus (Liq.) temperature employing a platinum boat are tabulated in °C.. Also recorded are the linear coefficient of thermal expansion (Exp.) over the temperature range of 25°-300° C. in terms of $\times 10^{-7}/°$ C., the density (Den.) in terms of grams/cc, and the viscosity of the glass at the liquidus temperature (Vis.) in terms of poises. Finally, an evaluation of the resistance to attack by acids was determined by measuring the 2 after an immersion weight loss (W.L.) in terms of mg/cm for 24 hours in a bath of 5% by weight aqueous solution of HCl, the bath operating at a temperature of 95° C.

Table II records the glass compositions of Table I in terms of mole percent.

liquid crystal display devices, it will be understood that they can be employed in other flat panel display devices such as electroluminescent displays and plasma displays.

I claim:

1. In a flat panel display device containing a flat, transparent glass substrate carrying polycrystalline silicon thin film transistors, the improvement wherein said glass exhibits a strain point of 655° C. or greater, a liquidus temperature below 1075° C., a long term stability against devitrification when in contact with platinum and high temperature refractory ceramic materials, a liquidus viscosity greater than $1.5 \times 10^5$ poises, and, being essentially free from alkali metal oxides and MgO, consists essentially, expressed in terms of mole percent on the oxide basis, of:

| | | | |
|---|---|---|---|
| $SiO_2$ | 63-68 | BaO | 4.5-10 |
| $Al_2O_3$ | 7.5-11 | CaO + SrO + BaO | 14-26 |
| CaO | 9.5-16 | $B_2O_3$ | 1-7 |
| S.O | 0-5. | | |

2. A flat panel display device according to claim 1 wherein said glass consists essentially of:

| | | | |
|---|---|---|---|
| $SiO_2$ | 64-66 | BaO | 4.5-8 |
| $Al_2O_3$ | 8-10 | CaO + SrO + BaO | 18-24 |
| CaO | 10-15 | $B_2O_3$ | 2-6 |
| SrO | 0-3. | | |

TABLE I

| | 7059 | 1733 | 1724 | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 50.0 | 57.0 | 56.8 | 58.32 | 57.1 | 56.0 | 54.3 | 57.9 | 55.1 | 54.5 | 56.8 | 57.0 |
| $Al_2O_3$ | 10.0 | 15.2 | 16.4 | 15.1 | 14.8 | 14.5 | 14.1 | 14.5 | 12.6 | 14.1 | 14.7 | 14.5 |
| $B_2O_3$ | 15.0 | 12.4 | 4.7 | 1.98 | 3.8 | 5.7 | 5.48 | 3.66 | 5.47 | 5.5 | 5.74 | 4.66 |
| CaO | — | 3.9 | 7.8 | 11.6 | 11.3 | 11.1 | 9.21 | 11.1 | 9.97 | 8.45 | 12.1 | 11.1 |
| SrO | — | 3.6 | — | — | 0.3 | 0.3 | 0.22 | 0.19 | 0.21 | 2.89 | 0.14 | 0.19 |
| BaO | 25.0 | 5.2 | 8.0 | 13.0 | 12.7 | 12.4 | 16.3 | 12.5 | 16.3 | 16.3 | 10.4 | 12.5 |
| MgO | — | 1.4 | 5.8 | — | — | | | | | | | |
| A.P. | 639 | 695 | 721 | 738 | 717 | 705 | 706 | 727 | 700 | 709 | 713 | 720 |
| St.P. | 593 | 640 | 674 | 690 | 671 | 658 | 659 | 680 | 655 | 664 | 672 | 678 |
| Liq. | 920 | 1041 | 1100 | 1060 | 1065 | 1001 | 1001 | 1016 | 1131 | 1021 | 1021 | 1001 |
| Exp. | 46 | 36.5 | 44 | 50.7 | 48.9 | 48.5 | 49.9 | 47.7 | 51.4 | 49.4 | 49.0 | 48.2 |
| Den. | 2.76 | 2.49 | 2.64 | 2.72 | 2.70 | 2.69 | 2.76 | 2.70 | 2.77 | 2.75 | 2.66 | 2.69 |
| Vis. | $1.8 \times 10^6$ | $10^6$ | 140,000 | — | 470,000 | $1.3 \times 10^6$ | — | — | — | — | — | 260,000 |
| W.L. | | 12 | 4 | 0.25 | 0.09 | 0.1 | 0.2 | 0.26 | 0.05 | 0.18 | 0.25 | 0.24 | 0.09 |

TABLE II

| | 7059 | 1733 | 1724 | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 63.3 | 65.0 | 62.8 | 67.5 | 66.3 | 65.0 | 64.9 | 66.9 | 65.2 | 64.4 | 64.9 | 65.9 |
| $Al_2O_3$ | 8.01 | 10.4 | 10.7 | 10.3 | 10.1 | 9.91 | 9.92 | 9.88 | 8.79 | 9.81 | 9.90 | 9.88 |
| $B_2O_3$ | 16.1 | 12.3 | 4.6 | 1.96 | 3.85 | 5.66 | 5.65 | 3.65 | 5.59 | 5.61 | 5.66 | 4.65 |
| CaO | — | 4.91 | 9.22 | 14.3 | 14.0 | 13.8 | 11.8 | 13.7 | 12.6 | 10.7 | 14.8 | 13.7 |
| SrO | — | 2.45 | — | — | — | — | 0.15 | 0.13 | 0.14 | 1.98 | 0.09 | 0.13 |
| BaO | 12.5 | 2.45 | 3.46 | 5.88 | 5.77 | 5.66 | 7.63 | 5.66 | 7.56 | 7.54 | 4.65 | 5.66 |
| MgO | — | 2.45 | 9.22 | — | — | — | | | | | | |

Examples 6 and 12 are considered to be the most preferred glasses.

Whereas the present invention has been described in detail utilizing the inventive glasses as substrates in

* * * * *